Dec. 27, 1960 D. C. COX 2,966,264
SORTING APPARATUS

Original Filed June 19, 1952 5 Sheets-Sheet 1

INVENTOR.
DAVID C. COX
BY Frederic B. Schramm
ATTORNEY

Dec. 27, 1960 D. C. COX 2,966,264
SORTING APPARATUS
Original Filed June 19, 1952 5 Sheets-Sheet 3

INVENTOR.
DAVID C. COX
BY Frederic B. Schramm
ATTORNEY

Dec. 27, 1960
D. C. COX
2,966,264
SORTING APPARATUS
Original Filed June 19, 1952
5 Sheets-Sheet 4
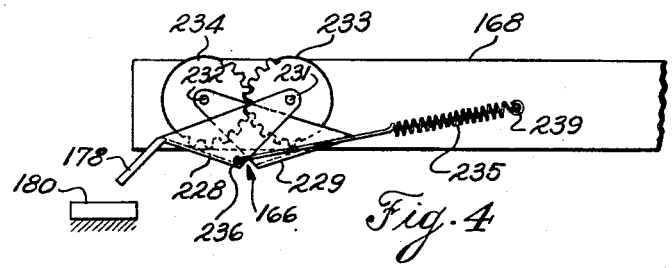
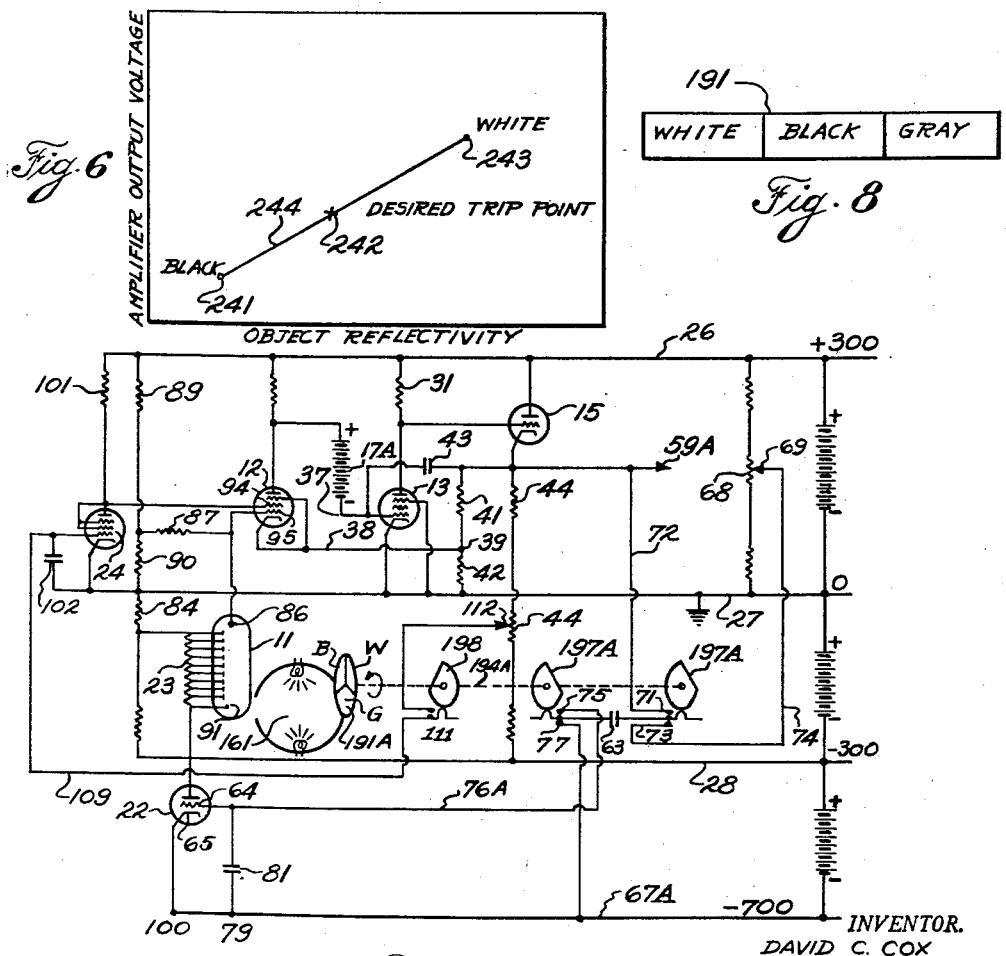
INVENTOR.
DAVID C. COX
BY Frederic B. Schramm
ATTORNEY

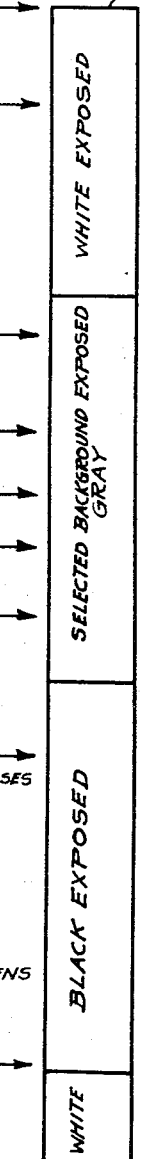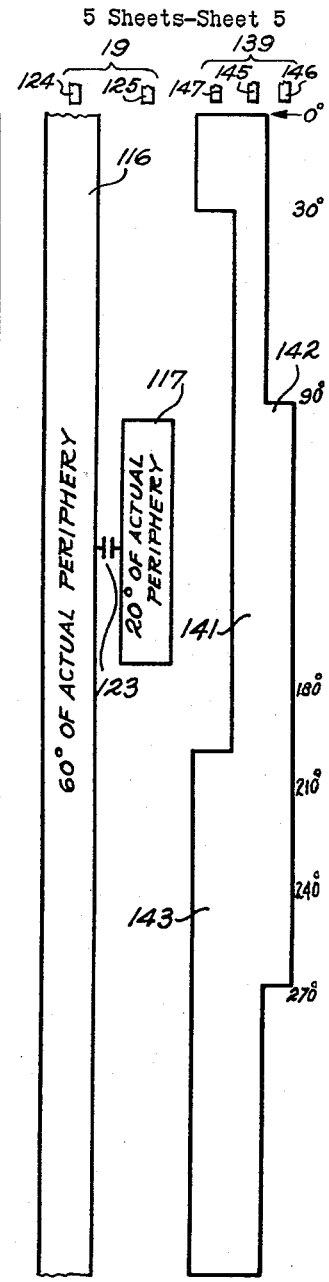
Fig. 5

United States Patent Office 2,966,264
Patented Dec. 27, 1960

2,966,264

SORTING APPARATUS

David C. Cox, Grand Rapids, Mich., assignor to Mandrel Industries, Inc., a corporation of Michigan Original application June 19, 1952, Ser. No. 294,427, now Patent No. 2,833,937, dated May 6, 1958. Divided and this application Dec. 3, 1954, Ser. No. 472,863

16 Claims. (Cl. 209—111)

This application is a division of my copending application, serial No. 294,427, filed June 19, 1952, Patent No. 2,833,937.

The invention relates to sorting and particularly to sorting by means of photo-electric tubes and apparatus electrically operated in response thereto.

An object of the invention is to provide an improved apparatus suitable for use in sorting fragile articles which must be handled gently.

A further object is to provide for photoelectric inspection of the articles without handling or supporting them. A more specific object is to inspect articles while they are falling freely and to receive the articles after free fall with relatively low deceleration thereof.

Still another object is to provide improved means for conveying the articles after they have been brought to rest with relatively low deceleration and to distribute the articles in different classifications according to their characteristics determined in the inspection process.

A further object is to delay the actuation of the classification means responsive to actuating signals produced in the inspection process until some time later the article has reached a position some distance from the inspection point where the classification means can conveniently be mounted.

Still another object is to provide improved, substantially uniform and constant illumination for the articles while being inspected, substantially free from flicker effect, and to provide for an automatic interruption of delivery of articles to the sorting apparatus in the event of electrical break down or unbalance in the illumination circuit.

Still another object of the invention is to provide a novel means for releasing articles from a traveling conveyor.

A further object is to provide an improved release gate for delivering articles to a free fall type of inspection head and to cause articles to travel through the inspection head accurately centered and released precisely in timed relationship to the actuation of the photo-electric responsive means in the inspection head.

Still another object of the invention is to enable the articles not only to be sorted but to be distributed or classified into different bins representing different classes of articles.

Other and further objects, features, and advantages of the invention will become apparent as the description proceeds.

Optical sorting machines of the photoelectric type have been employed, for example, in the sorting of fruits, beans, and nuts on a basis of light reflecting power or color so that the product, after acceptance by the machine is substantially uniform and so that discolored or otherwise defective specimens are rejected. The machines are not only much more rapid in action than human inspectors or graders, but are far more accurate and consistent.

Examples of the type of machines to which reference is made are disclosed in my U.S. Patents Numbers 2,131,-095; 2,152,758; 2,244,826; 2,264,621; 2,325,665; 2,474,-230; and 2,656,923, and in my copending applications Serial No. 102,764, filed October 11, 1949, on which Patent 2,690,258, issued September 28, 1954; Serial No. 738,714, filed April 1, 1947, on which Patent 2,625,265, issued January 13, 1953; Serial No. 294,427, filed June 19, 1952. In general, these machines and the machine of the present invention include a conveyor by which the objects are moved to or through a viewing station in which they are illuminated and the light reflected from the objects affects a photoelectric cell. The output of the photoelectric tube varies with the reflection characteristics of the object. The voltage or current effect is amplified and the amplified potentials, by means of gas-filled tubes and electromagnetic actuators, operate ejectors or other means by which objects too light or too dark or of the wrong color are directed into a predetermined path and thus separated. If color discrimination is desired, a masked cathode ray tube and photoelectric relay operated thereby may be employed, as in my Patent No. 2,244,826. The machines ordinarily may segregate either objects which are too light or those which are too dark, and in some cases, may segregate both light and dark objects, passing those objects which fall within a predetermined range of reflectivity, which may be termed a band pass operation.

A serious problem with such machines is that of maintaining accuracy and constancy in calibration of the machine in spite of such disturbing effects as variations in line voltage, changes in temperature, aging of lamps, photocells, vacuum tubes, and other elements of the electrical system, dust or dirt in the optical system, etc. Various approaches to this problem, which have greatly improved the performance of sorting machines, have been disclosed in the above mentioned patents. In general, this self-correcting feature of the previous machines, which I have termed "normalizing" has involved intermittently exposing the photoelectric cell to a standard of reflectivity, usually a reference background viewed in the intervals between the passage of the objects and chosen to correspond to that of articles which are to be passed by the machine as acceptable. The overall response of the system to the reference object is employed in some manner to vary the sensitivity or trip point of the amplifier so that a standard output is obtained when the standard object is viewed and in effect the object examined is compared with the reference background.

An important object of this invention is to regulate the system to maintain a constant response notwithstanding the abovementioned disturbing factors as well as an additional factor which I call "glare" or the light reaching the photoelectric cell but not coming from the object viewed or a reference background, and which is also subject to variation with various conditions such as dirt in the lamp housing and fading or darkening of painted surfaces. An object is also to accomplish such results more reliably than heretofore and to avoid the necessity for direct comparison of the article with the background. The apparatus is not limited to "null" operation, i.e. to indicating whether or not an object deviated in reflectivity from a background or standard specially prepared or selected for the purpose.

In carrying out the invention there is incorporated in the system a phototube of the electron multiplier type and means are provided by which the multiplication factor of this tube is regulated to correct for changes, both in this tube and in other units of the system, which affect the response of the system. An additional regulating means is provided to compensate for glare.

Another advantage of the invention is that it is well adapted to use with various devices for presenting the objects to the phototube and with various devices by which off-standard objects are separated. The conveying portion of the device may be, for example, of various forms disclosed in my previous patents, such as a wheel on which the objects are retained by suction, a screw or other conveyor by which they are pushed through the viewing zone, or a compartment through which the objects fall by gravity. The device by which the objects are segregated may be of any known type appropriate to the nature of the objects and the character of the apparatus by which they are presented for inspection.

The invention provides an improved amplifier circuit well adapted for sorting machines of the free-fall type. For this reason the invention is described as incorporated in a free-fall machine of the general type disclosed in my copending application, Serial No. 64,967, filed December 13, 1948, on which Patent 2,656,923 issued on October 27, 1953. The amplifier is nevertheless applicable to other types of machines and to machines constructed in accordance with my other patents as previously stated and may be employed beneficially in various photoelectric examining machines and processs.

Provision of an efficient, rapid and accurate self-regulating feature for the system is an important object of my invention. The preferred regulating means employs a condenser which is charged in accordance with the response of the machine to a standard intensity of illumination preferably relatively bright or substantially white, which I refer to as the "white" standard, and then furnishes grid bias to a vacuum tube in the system to standardize the output of the system for such "white" standard with respect to phototube sensitivity. A relatively large condenser may be employed to provide great constancy of the bias voltage, great charging time or requiring a low-impedance charging circuit. The condenser is unaffected by the objects examined. The regulation involves varying the interelectrode voltage of an electron multiplier phototube under the control of the regulating condenser and is extremely sensitive.

In conjunction with the regulation of the phototube to correct for various disturbing factors such as those mentioned in my said copending application Serial No. 120,724, filed October 11, 1949, now Patent No. 2,690,258, I have provided an amplifier gain regulator or operating-point setter which I refer to as a glare compensator so that an entirely new function is performed and a new feature has been introduced into amplifier stabilization which enables such amplifier to be compensated and to maintain its calibration in accordance not merely with a single point but all along a desired characteristic line.

The novel glare compensating means comprises also comprises a condenser which is charged in accordance with response of the machine to a second standard of illumination preferably a relatively low level illumination compared with the one used in connection with the phototube regulating feature and which latter standard I therefore refer to as the "black" standard. In a preferred form of the invention for accomplishing glare compensation a vacuum tube type voltage regulator is provided for controlling a suitable voltage such as the screen grid voltage of the amplifier tube following the electron multiplier phototube for controlling the amplifier gain or operating point. The grid bias of the screen grid voltage regulator is set according to the condenser charge which is determined by the response of the circuit to the black standard, thereby eliminating any effect of glare or extraneous or spurious light.

By way of introduction to the complete description of the preferred embodiment of the invention, the nature of the electrical system may be outlined as follows: The dynodes of the electron multiplier phototube are connected to a voltage divider. A regulating device is interposed between the power source and this voltage divider so that the electrode voltages may be regulated. This regulating device is preferably a vacuum tube, the effective resistance of which may be changed by varying its grid potential. Variations in light entering the phototube vary its output current and thereby the drop in a series resistor. The resulting potential variations control an amplifier, which is preferably one of a phase-inverting type employing two pentode tubes, the outputs of which vary oppositely with changes in the control potential but are normally balanced.

In carrying out the invention in accordance with a preferred form thereof, as applied to the sorting of articles such as lemons, I provide a framework supporting at the upper portion thereof, a substantially horizontal conveyor adapted to receive lemons or other articles and deposit them one at a time upon an upper gate and having a sorting head mounted below the upper gate. The sorting head includes a lamp housing having a vertical passageway therein for freely falling objects released by the upper gate. A device which I call a "catcher" is provided for receiving the objects as they fall out of the passageway and very gradually decelerating each one in succession so as to avoid bruising it. The catcher is provided with means for releasing the object at the lower end of its travel and mechanism is provided for distributing the objects in bins or receptacles for classification according to the response which the light has produced in the photoelectric control circuit.

The lamp housing has side walls shaped to form a hexagonal prism and lamps mounted slightly beyond the upper and lower edges of the side walls for indirectly illuminating the interior of the lamp housing and casting diffused light upon the articles falling along the axis of the prism. Background screens or reference backgrounds are provided along three alternate vertical walls of the prism to serve as standards of comparison of the light reflective properties of the articles being sorted, and at the three remaining side walls light-receiving and directing elements are provided.

The background screens are in the form of movable, preferably rotating members such as discs or cylinders divided into three areas. One of the areas is white or quite light, to provide the said "white" standard to which reference has been made. One is very dark or black to provide the "black" standard to which reference has been made, and the third is gray or colored with such a light reflection factor as to correspond to the reflectivity of the average of desired objects which are to be accepted or rejected by the circuit according to the manner of operation employed.

If desired, each of these light-receiving and directing elements may comprise a lens system adapted to form received light into a beam projected against a photoelectric tube. Preferably, however, two of the light-directing elements comprise mirrors mounted at such an angle as to reflect the light toward the wall containing the lens system forming the remaining light-directing element, and a single photoelectric tube is provided for response to the reflected light in all three of the beams of light. This arrangement is preferable for the sake of simplicity and minimum cost of apparatus, especially in the case of a photoelectric sorting operation carried out by what is known as the "light trip" method. This is a method in which the mechanism is actuated whenever the light reflective properties of the article integrated over substantially the entire surface thereof exceed a predetermined value. In other words, the light trip method is the one in which all lemons lighter than a first predetermined standard produce actuation of the mechanism, tripping release mechanism through a suitable delay device, and enabling such lemons to fall into a given receptacle; lemons darker than the first predetermined standard, but lighter than a second standard trip a second mechanism to fall into a second classification, and so on, according to the number of classifications for which the apparatus is arranged.

Cam mechanism or the equivalent is preferably provided for opening and closing the upper gate at a predetermined rate and a second cam mechanism or eccentric, or equivalent mechanism, is provided for operating the catcher. Mechanical drive is provided with gearing of such ratio and so related to the cam or the eccentric that an article progresses to the end of the conveyor and falls upon the upper gate once for each operation of the upper gate and this happens during the time interval while the upper gate is closed after it has allowed the previous article to fall through the passage in the lamp housing. The operation of the catcher is also synchronized with the upper gate, allowing for the time required for the article to fall through the lamp housing.

Although the invention is not limited thereto, preferably I employ a thyratron type of tube, that is a vapor discharge or gaseous discharge amplifier tube, for energizing a magnet for moving a trip pin actuating a gate in a moving conveyor pan, which causes it to remain closed or to open with a fixed time delay after actuation of the light-responsive mechanism according to the arrangement for distributing the sorted articles into classes. One or more stages of vacuum tube amplification are interposed between the photoelectric tube and the thyratron. A breaking switch or commutator, also synchronized with the conveyor, upper gate cam, and the catcher cam is provided in the anode supply circuit of the thyratron tube in order that it may be de-energized after each operation of the conveyor pan gate tripping mechanism and be prepared for a subsequent operation.

In order that the point at which the thyratron is tripped in relation to the intensity of the illumination of the photoelectric tube will remain accurately constant and unaffected by various tendencies toward drift, such as aging of the various tubes and filaments, heating of resistors, variations in filament, voltage, dust, fingerprints and the like in the lens system and other portions of the optical system, and also variations in glare, the amplifier is provided with what I call a phototube regulator and an operating point setter or "compensator."

A better understanding of the invention will be afforded by the following detailed description considered in conjunction with the accompanying drawings, in which:

Fig. 4 is a diagram illustrating a form of movable hopper or gate which may be employed in connection with the apparatus in Fig. 3;

Fig. 5 is a sequence table illustrating the order in which the various mechanical and electric parts or elements may be caused to operate in employing the amplifier circuit of Fig. 1;

Fig. 6 is a graph illustrating the calibration of the amplifier circuit of Fig. 1 and its manner of operation;

Fig. 7 is a circuit diagram with schematic representation of certain parts to explain the principle of operation; and Fig. 8 is a developed view of the background cylinders.

Like reference characters are used throughout to designate like parts.

Figure 1:
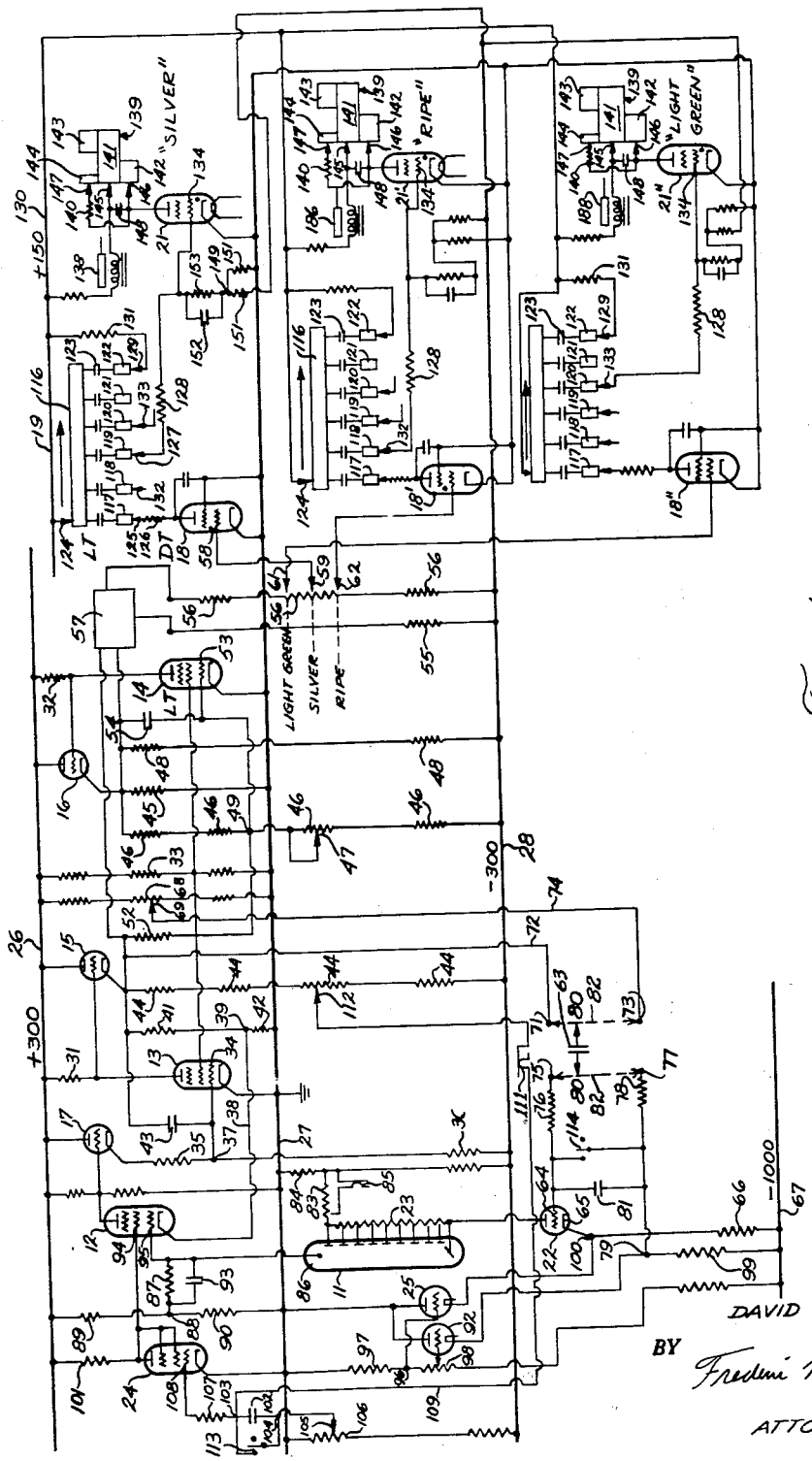
Fig. 1 is a circuit diagram of an amplifier in accordance with my invention.

The parts of an illustrative embodiment of the invention are shown essentially in Fig. 7. More detailed descriptions and explanations will be given hereinafter in connection with the other figures of the drawings. The embodiment illustrated in Fig. 7 comprises a photoelectric tube 11 of the electron multiplier type accompanied by an amplifier circuit including a first stage amplifier tube 12, the operating point of which is controlled by a glare-compensation tube 24, a second stage amplifier tube 13 and a cathode follower tube 15. There is a tube 22 serving as a regulator for the electron multiplier type phototube 11. The photoelectric tube 11 is associated with a lamp housing 161 through which articles to be sorted are allowed to fall. The photoelectric tube 11 is arranged to receive light reflected from the objects falling through the lamp housing 161. There is also a variable background 191A so mounted that light reflected from it affects the photoelectric tube 11 when no article to be sorted is in the field of view. As shown in Fig. 7, the background 191A is in the form of a rotatable disc having three sectors marked B, W and G representing black, white and gray areas, or dark, light and medium shaded areas respectively. The amplifier circuit has an output terminal 59A at which voltage appears indicating the reflectivity of the object falling through the lamp housing 161.

An intermittently closing switch 111 is provided for readjusting the glare compensator tube 24 when the phototube 11 receives light reflected from the dark portion B of the background 191A and a bias-setting transfer condenser 63 is provided for readjusting the bias of the regulator tube 22 and regulating the photoelectric tube 11 when the light portion W of the variable background 191A affects the phototube 11. In each case the adjustment is made in accordance with deviations of the amplifier output to correct such deviations. A double throw switch is provided for the transfer condenser 63, including contacts 73, 77, 71 and 75. The contacts 73 and 77 serve to connect the regulator tube bias-setting condenser 63 between a line 67A of low potential, for example minus 700 volts and a point of adjustable fixed potential 69, consisting of a tap on a voltage divider resistor 68. Alternatively, the contacts 71 and 75 serve to connect the condenser 63 between an output terminal 59A of the cathode follower 15 and the control grid 64 of the regulator tube 22. There is a bias-holding condenser 81 between the grid 64 and the cathode 65 of the tube 22.

Means are provided for operating the transfer switch of the condenser 63 in synchronism with the rotatable background 191A. For example, as shown, the background disc 191A may be mounted upon or driven by a shaft 194A, which carries a cam 198 for operating the switch 111 and cams 197A for operating the switch 73—77, 71—75. Suitable mechanism, not illustrated in Fig. 7, but synchronized with the shaft 194A is provided for causing an object to be released above the lamp housing 161 at such a time that it will be in the lamp housing when the medium shade or gray portion G of the background 191A is in the lamp housing. The cams 197A are also so placed on the shaft that the switch contacts 73 and 77 may be closed at this time but the transfer switch contacts 71 and 75 for the condenser 63 will be closed momentarily when the background 191A is in such a position that the photoelectric tube 11 is exposed to the white or light-colored portion W. The cam 198 for operating the switch 111 is so mounted on the shaft 194A, however, that the switch 111 will be closed connecting the control grid of the glare compensator tube 24 to a suitable potential setting point 112 on a voltage divider 44 during the period of time that the background 191A is in such an angular position that the photoelectric tube 11 is exposed to the dark colored or black portion B thereof. The voltage divider 44 supplies a voltage varying with that of the output terminal 59A.

The arrangement is such that the voltage output at the terminal 59A varies linearly with the reflectivity of an object dropped through the lamp housing 161 and is automatically adjusted to correct for dust, aging and other factors by resetting two points on the amplifier characteristic curve each revolution of the shaft 194A. Linear response is obtained by the negative feed back to the grid of the tube 13 by the back coupling condenser 43, and by the negative feed back through the line 38 to the cathode of the tube 12.

The response to a low level of reflectivity or the dark portion B of the background 191A is reset automatically by correcting the output appearing on the voltage divider 44 which is fed back through the tap 112 and the line 109 to the control grid of the glare compensator tube 24. This is referred to as the glare compensator tube because it corrects for errors introduced by glare or extraneous light with variations in dust or dirt in the lamp housing, dust on lamps, etc.

The white or high-reflectivity point on the characteristic curve of the amplifier is set by the automatic adjustment of the sensitivity of the photoelectric tube 11 when it is exposed to the white or light colored portion W of the background 191A. Electron multiplier tubes such as tube 11 vary in sensitivity according to the voltage applied to the dynodes connected along the voltage divider resistor 23. The voltage drop in the resistor 23 in turn is determined by the magnitude of the current flow through the regulator tube 22 which is controlled by the potential of its grid 64, which is controlled by the potential of the output terminal 59A through the condenser 63 so as to correct the sensitivity of the tube 11 to give the required output corresponding to the reflectivity of the light colored or white portion W of the background 191A. The proper charge on the condenser 63 to give the required potential difference is maintained by the repeated connection of the condenser 63 between the points 69 and 67A.

For simplicity in the drawing batteries have been shown connected to the lines 26, 27, 28 and 67A to give the required differences of potential with respect to ground line 27. It will be understood, however, that in practice rectified alternating-current sources may be employed taking the form of conventional power packs.

The reference numerals in Fig. 7 designate the same parts as in the other figures of the drawings except where different but corresponding parts are illustrated in Fig. 7, in which case the letter A is affixed to the reference numeral to indicate the part or connection to which it corresponds in Fig. 1 of the drawing. For example, the battery 17A, is illustrated in Fig. 7 to represent means for causing the potential of the control grid of the tube 13 to follow the plate potential of the tube 12 but at a lower level. In Fig. 1 this is accomplished by a cathode follower tube 17 having a point 37 in its cathode resistor connected to the control grid 34 of the tube 13.

It will be understood that suitable mechanism, an example of which is illustrated in the other figures of the drawings, is provided which is responsive to the output potential at the terminal 59A for carrying a suitable indication or producing a suitable action according to the magnitude of the reflectivity of the object or article which has fallen through the lamp housing 161.

The amplifier of Fig. 1 is arranged to regulate an electron multiplier photoelectric tube 11 and to amplify the output signal thereof for operating suitable solenoid tripping mechanism or a mechanical classifying device. The amplifier circuit comprises a suitable first-stage amplifier such as a pentode tube 12 followed by a push-pull stage or unit comprising a pair of amplifier tubes which may also be pentodes 13 and 14, preferably with cathode follower tubes shown as triodes 15 and 16 interposed. Preferably, a cathode follower such as a triode 17 is interposed between the first stage amplifier tube 12 and the push-tube 13 of the push-pull circuit.

Preferably, for supplying sufficient power to operate a solenoid directly or through delay mechanism an additional power amplifier stage such as a gas filled tube or thyratron 18 is provided. In the specific circuit illustrated a signal storing or delay device of the type shown in my copending application Serial No. 738,714, filed April 1, 1947, now Patent No. 2,625,265, is employed consisting of a commutator 19 represented in developed form. Where a delay device of this type is employed, in order to obtain sufficient energy for operating a conveyor tripping solenoid, an additional power amplifier stage 21 is provided which may take the form of gas filled tube or thyratron.

In order to regulate the photoelectric tube 11 by adjusting the voltage applied to the dynodes thereof, a current regulator is employed shown as taking the form of the triode vacuum tube 22 connected in series with a resistor 23 serving as a dynode voltage divider for the photoelectric tube 11, so that the tube 22 actually serves as a voltage regulator. The regulation of the tube 11 serves not only for overcoming variations in the characteristics of the tube 11, itself, but also various other disturbing factors involved, such as, fluctuations in filament voltages and the like, amplifier tube and lamp aging, etc., causing amplifier drift.

For compensating the amplifier against the effect of glare and variations therein, resulting from such factors as dust in the lamp housing and other factors causing variations in the light affecting the photoelectric tube other than the light reflected by the object to be sorted, a voltage regulator is provided for controlling a suitable voltage in the amplifier circuit, for example, the screen grid voltage of the first stage pentode tube 12. The glare compensating voltage regulator in the embodiment of the invention illustrated, comprises a vacuum tube which may take the form of a pentode 24 with the second and third grids shorted to the plate to act as a triode.

An additional tube shown as a triode 25 may be employed in conjunction with the current regulator tube 22 to assist in holding the cathode potential thereof.

The push-pull circuit consisting of the tubes 13 to 16 is provided with feed-back connections for producing linearity and with connections for causing the "pull" or "light trip" stage 14 to follow the "push" or "dark trip" stage 13 faithfully. It will be understood that the invention is not limited to the use of specific tube types nor voltages. Nevertheless, for the sake of providing concrete illustration the circuit has been shown as using a 300-volt positive voltage supply 26 for the anodes of the tubes with a grounded line 27 for the cathodes of most of the tubes and a 300-volt negative supply 28 for bias potentials for the tubes 13 and 14. The tubes 13 and 14 are supplied with anode potential through anode resistors 31 and 32. A suitable voltage divider consisting of resistor 33 is provided for screen potential in the tubes 13 and 14. The control electrode or grid 34 of the tube 13 is supplied with a signal from the amplifier tube 12, preferably through the cathode follower stage 17. In order to enable the grid 34 to be brought down to a point below ground potential, the cathode follower 17 is provided with cathode resistors 35 and 36 connected between the cathode of tube 17 and the negative supply 28, with a junction terminal 37 connected to the control grid 34 of the tube 13.

The amplifier is rendered linear by means of negative feed back. Thus the input amplifier tube 12 is cathode coupled to the output of the tube 13 through the cathode follower 15 by virtue of the connection of the cathode of the tube 12 through a conductor 38 to a junction terminal 39 of a pair of resistors 41 and 42 connected in series between the cathode of the cathode follower 15 and the ground line 27. In addition there is a negative feed back connection from the cathode follower 15 through capacity coupling by condenser 43 to the control grid 34 of the tube 13. The cathode follower 15 also has its cathode connected to the negative 300-volt supply line 28 through a resistor 44.

The cathode of the cathode follower 16 is likewise connected to the ground line 27 through a cathode resistor 45 and to the minus 300-volt line 28 through resistors 46, one of which is made adjustable by means of a tap 47 for the purpose of balancing the circuit. As illustrated, there may also be a shunt cathode connection to the minus 300-volt line 28 through a resistor 48. A voltage divider tap 49 is provided in the resistors 46 to which the cathode of the cathode follower 15 is connected through a resistor 52. In this manner the control electrode or grid 53 of the tube 14 is coupled to the cathode follower 15 and to the tube 13. Since the cathode follower 16 is coupled to the tube 14 by a connection of its grid to the plate of the tube 14, the output of the tube 14 appears at the cathode of the cathode follower 16.

A feedback connection is also provided from the cathode follower tube 16 back to the tube 14 through a coupling condenser 54 interposed between the cathode of the cathode follower 16 and control grid 53 of the tube 14. However, the "pull" tubes 14 and 16 are not included in the feed back loop of the "push" tubes 13 and 15 so that linearity is maintained; and owing to the symmetry of the circuit the pull tubes 14 and 16 follow with mathematical accuracy, but inverted, the signal of the push tubes 13 and 15. Any possibility of circuit oscillation as a result of inherent inductance in the circuit is avoided by the high frequency feed back produced by the condensers 43 and 54. Thus, the high frequency or the capacity feed back provided by the condenser 43 between the grid 34 and the cathode of the tube 15 acts in opposition to the original signal and slows down the response time of the amplifier enough so that the cathode of the tube 13 can follow its grid without over-shooting and therefore, the circuit does not oscillate.

For the purpose of taking off a signal from either the push tube cathode follower 15 or the pull tube cathode follower 16, according to whether a signal of one polarity or the opposite polarity is desired, symmetrically arranged output resistors 55 and 56 are provided. If desired, a signal receiving device or signal response unit may be tapped into each of these resistors. However, for simplicity a signal selector thyratron 18 is shown as being coupled to only one of the resistors, viz., resistor 56. In order to render it possible for the thyratron to be rendered responsive to signals of either negative or positive polarity, a conventional change over switch 57 is provided so that with the switch 57 in the upper position the resistor 56 is actually connected to the cathode follower 15 and the resistor 55 is connected to cathode follower 16. With the switch 57 in a downward position the reverse connection is obtained. The function of the resistors 45, 48 and 55 is to keep the overall current required by the amplifier, from the plus 300 volt line 26 and the minus 300 volt line 38, approximately constant. The resistor 45 has the same resistance as the resistor 41. Likewise, the resistor 48 has the same resistance as resistor 44 and resistor 55 has the same resistance as resistor 56. With equal resistances under the two tubes 15 and 16, whenever the tube 15 is raised or lowered it turns on or off the current but, when the tube 15 is raised, tube 16 is lowered and vice versa, and the tubes will turn on or off an equal amount of current so that the current taken from the voltage lines 26 and 28 of the plus and minus 300 volt supply is constant at all times. The tube 13 is thus balanced by the tube 14. Although the tubes 12 and 24 are not balanced, the current taken by these tubes is very small and there the change in current is even smaller. Arranging the amplifier so as to require constant current has the advantage of enabling the plus 300 and minus 300 volt supplies to perform their function more readily and also to decrease the chance of cross modulation between amplifier stages or circuits.

The selector thyratron 18 is provided with a control electrode or grid 58 connected to an adjustable tap 59 on the output resistor 56. Inasmuch as tubes of the gas filled or thyratron type are rendered conductive when the control potential is raised above a predetermined level such as cathode voltage or a small negative voltage according to the design of the tube, the intensity of the signal required to fire the tube 18 may be adjusted by sliding the tap 59 along the resistor 56. The taps 61 and 62, shown in dotted lines, represent alternative positions which may be employed for causing the selector thyratron 18 to fire with smaller or larger input signals respectively.

In order to regulate the photoelectric tube 11 in accordance with the response of the amplifier circuit to a given input signal, a shifting condenser 63 is provided for transferring variation in potential of the output terminals of the amplifier to the control terminal of the voltage regulator 22 for the tube 11. This voltage regulator tube 22 is provided with a control electrode or grid 64 and has a cathode 65 connected in series with a cathode resistor 66 to a negative power supply source, for example, a minus 1000-volt supply line 67. In order to supply a standard of reference voltage a voltage divider resistor 68 is connected between the 300-volt line 26 and ground line 27 and has an adjustable tap 69. Suitable connection points of switch terminals for the condenser 63 are provided comprising a terminal 71 connected through a conductor 72 to the cathode of the cathode follower 15 and terminal 73 connected through a conductor 74 to the voltage divider tap 69. A terminal 75 is connected through a current limiting resistor 76 to the grid 64 of the regulator tube 22. Another terminal 77 is connected through a second voltage limiting resistor 78 to a suitable controlled potential point for example, to a terminal 79. Preferably a condenser 81 is connected between the grid 64 and the terminal 79 for the purpose of holding the regulator voltage until another adjustment is made by the condenser 63, the cathode 65 of the tube 22 being held at a fixed potential as will be explained more in detail hereinafter.

As represented by the arrows 82 the regulating condenser 63 is arranged as a voltage transfer device having movable contacts 80 for connecting the condenser 63 intermittently, momentarily to the terminals 71—75, then to the terminals 73—77 and then back to the neutral unconnected position illustrated in the drawing. The mechanical arrangements for accomplishing this action do not form a part of my present invention and therefore are not illustrated. A suitable type of S-cam operated mechanism for transferring the condenser connections is represented diagrammatically by the reference numeral 99 in Fig. 2 of my copending application, Serial No. 120,724, filed October 11, 1949, now Patent 2,690,258. As will be explained more fully hereinafter, when the amplifier circuit is used in connection with photoelectric sorting, the regulator condenser 63 is preferably arranged to perform its transfer action, for regulating the voltage applied to the photoelectric tube 11, during the period of time that the photoelectric tube 11 is exposed to the white background.

It will be observed that the dynode voltage divider 23 for the photoelectric tube 11 is connected in series with resistors 83 and 84 to the ground line 27. The resistor 84 is part of a voltage-divider connected between ground and the minus 300-volt line. The resistor 83 is normally short-circuited by a jack 85 adapted to receive a microammeter for reading volts per dynode when adjustments are being made.

The photoelectric tube 11 has an anode 86, connected in series with a resistor 87 to a point 88 of suitable potential and voltage divider consisting of resistors 89 and 90 connected between the plus 300-volt line 26 and the ground line 27, and a cathode 91 connected to the plate or anode of the regulator tube 22.

A by-pass condenser 93 is also connected across the resistor 87 to avoid random noise effects.

It will be observed that the anode 86 of the tube 11 is connected directly to the control grid 95 of the input amplifier tube 12.

The tube 25 has its anode connection to the ground line 27 and its cathode connected in parallel with the cathode 65 of the regulator tube 22, with its grid connected to a junction terminal 96 of voltage-divider resistors 97 and 98 connected in a series between the ground line 27 and the minus 1000-volt line 67. The tube 25 acts as a cathode follower to stabilize the cathode potential of the tube 22 at a potential fixed by that of the terminal 96.

In order to avoid jerking of the cathode of the tube 22 when the reference voltage is applied to the condenser 63 in the course of regulating the phototube 11, an additional cathode-follower tube 92 is provided. Tht tube 92 has a cathode resistor 99 connected to the minus 1000-volt line 67 and its anode is connected to the ground line 27. Its cathode terminal 79 serves as the connection point for the resistor 78 in the negative side of the charging (or discharging) line for the condenser 63. A cathode terminal 100 for the tube 22 is provided which is common to the cathode of the tube 25. In this manner the cathode potential for the tube 22 and the potential of the terminal 79 of the bias condenser 81 are separably and independently fixed rigidly by separate cathode followers.

As already explained, the input amplifier stage tube 12 has the potential of its screen grid 94 controlled for adjusting its operating point to compensate for any variations in glare. The screen grid voltage regulating tube 24 is connected in series with the 300-volt line through an anode resistor 101 and has its cathode directly grounded to line 27. A direct connection is made between the anode or plate of the tube 24 and the screen grid 94 of the tube 12. For adjusting the output of the voltage regulator tube 24, in accordance with the response of the circuit itself to variations in glare, a glare compensator condenser 102 is provided, having a grid terminal 103 and a tap terminal 104.

The terminal 104 is connected to a point of suitable potential, preferably somewhat negative, provided by a tap 105 on a potentiometer 106 connected between ground line 27 and the minus 300-volt line 28. The terminal 103 of the condenser 102 is connected through a current-limiting resistor 107 to the control electrode of grid 108 of the screen-grid voltage regulator 24. A connection is also provided through a line 109 including an intermittently closing cam-operated switch 111 between the terminal 103 of the condenser 102 and an adjustable tap 112 on the cathode resistor 44 of the cathode follower tube 15. Consequently, whenever the switch 111 is closed a voltage is applied to the condenser 102 proportional to the output of the amplifier circuit as will be explained more fully hereafter. The glare compensator switch 111 is arranged to be closed for a sufficient interval of time to charge the condenser 102 within the period of time that the photoelectric tube 11 is exposed to the black background. The mechanical construction of the glare compensator switch 111 does not form a part of my present invention and therefore it is not illustrated in detail.

In order to facilitate the setting or calibration of the amplifier circuit to place the black background and the white background standardizing points on the desired straight line output curve, switches 113 and 114 are provided. These switches are normally open during the operation of the apparatus. When it is desired to calibrate the black background point the black background is placed in the view and the cam switch 111 is closed. Then adjustment is made of the tap 112 on the cathode resistor 44 until the output of the amplifier is at the desired value.

The switch 114 aids in setting the white background point. For setting the white background an adjustment is found which brings the voltage across the condenser 81 to zero. The tap 69 on the voltage divider 68 is set at a point corresponding to the percent reflectivity of the white background used. Then the tap on the potentiometer 98 is adjusted for setting the grid voltage of the cathode-follower tube 92 in order to set the potential of the terminal 79 of the condenser 81. The switch 114 is normally open, but the adjustment is such that the voltage across the condenser 81 remains zero whether the switch 114 is open or closed. To determine the requisite adjustment, the condenser 63 is transferred back and forth between its two contacting positions until an adjustment of the tap of the potentiometer 98 is found at which no change in output occurs. The switches 113 and 114 serve during the amplifier setting procedure to reduce the voltage across the bias condensers 102 and 81 to zero. Reducing the potential to zero across these two condensers minimizes the chances of the condensers leaking. After the settings have been made and the switches opened, the potential of one terminal of each condenser remains fixed and the remaining terminal is moved either positive or negative, depending on whatever input the amplifier requires to keep its output at the two fixed points, as the black and white contacts are made. The switches 113 and 114 may also be used for trouble shooting in the circuit. By closing the switches one can fix the grids of tubes 22 and 24 to some rigid point. This aids in analyzing the rest of the circuit when it is known that those two points are fixed.

The delay device or signal-storing device 19 as shown diagrammatically, may be of the same general type shown in my said copending application, Serial No. 738,714, filed April 1, 1947, now Patent 2,625,265 and in my issued Patents Numbers 2,244,826 and 2,264,621. Preferably the delay timing device of the form shown consists of a commutator having a collector ring 116, and a plurality of contact segments 117 to 122, each of which is connected to a separate one of a plurality of signal-storing condensers 123, the remaining side of which is connected to the collector ring 116. For connecting the collector ring 116 to a suitable direct-current source such as a positive 150-volt line 130 there is a contact brush 124. For connecting the contact segments 117 to 122, in turn, to suitable points in the circuit, a plurality of brushes are provided including a "writer" brush 125 connected to the anode of the selector thyratron 18 through an anode resistor 126. There is a "reader" brush 127 for connecting the stored input signal of each of the condensers 123 in succession after a time delay to a suitable output circuit through a resistor 128. In this case the classifier thyratron 21 is actuated by such signals. For discharging each of the condensers 123 before its contact segment again engages the selector thyratron brush 125, a discharge brush 129 or "eraser" is provided, which is connected to the 150-volt line 130 through an energy absorbing resistor 131.

It will be understood that the speed of the delay device commutator 19 is determined by the number of contact segments and signal storing condensers thereon. In the form shown there are six condensers 123 and six corresponding contact segments. The commutator 19 would therefore be arranged to make ⅙ of a revolution per cycle of the device, that is the time interval between arrival of successive objects to be sorted in the sorting head, or in view of the photoelectric tube 11. In other words, the commutator 19 rotates at ⅙ the speed of cams operating the article releasing mechanism. It may operate at ⅙ of the speed of cams operating the glare compensator switch 111 and the transfer switch for the regulator condenser 63, if they are operated every cycle. It will be understood that if the commutator 19 is intended to supply signals of different delays or a plurality of signals each with a different delay, additional brushes 132 and 133, etc. may be provided with connections to suitable signal receiving devices.

In order that the input signal from the brush 127 of the signal delay commutator 19 may be supplied to the control electrode or grid 134 as a voltage variation either with respect to ground or with respect to the line 130, a double-pole, double throw transfer switch may be provided with a transformer interposed, so that with such a transfer switch in the former position the classifier thyratron 21 fires for each uncharged condenser and with the switch in the latter position the thyratron 21 fires for each charged condenser.

In practice, however, I have found it unnecessary to utilize the latter type of operation. For simplicity, therefore, I have illustrated only the arrangement in which the classifier thyratron 21 is fired each time the "reader" brush 127 contacts an uncharged condenser, the signal being supplied to the control electrode 134 as a voltage variation with respect to the ground line 127.

The thyratron 21 may be arranged for operating any suitable device in response to the signal output or lack of output of the amplifier. For the sake of illustration, however, it is shown as arranged to operate a solenoid device 138 connected in series between the anode of the thyratron 21 and the positive supply line 130. Since tubes of the gas-filled type such as thyratrons are not ordinarily self-extinguishing, a suitable extinction device such as a commutator 139 is preferably provided, which is arranged to make one revolution per cycle of the sorting apparatus to which the amplifier is connected. As will be explained more fully in detail hereafter, the solenoid 138 may be arranged for operating trip pins for dumping pans in a sorting machine output conveyor to classify the assorted articles according to the optical response of the amplifier thereto.

The form of commutator 139 shown comprises a continuous collector ring 141, a 180° segment 142, and a second 180° segment 143, displaced somewhat less than 180° from the segment 142 so that there is a partial overlap represented by the portion 144 of the segment 143. Corresponding with the collector ring 141 is a brush 145, with the segment 142, a brush 146, and with the segment 143 a brush 147. As shown, the brush 146 is connected directly to the anode of the thyratron 21, the brush 145 is connected in series with the solenoid 138 to the positive voltage supply 130. Preferably a resistor 140 is connected between the brushes 146 and 147, and a condenser 148 is connected between the brushes 146 and 145. The control electrode 134 of thyratron 21 is preferably provided with negative bias by a connection through a resistor 153 to a tap 149 on voltage divider resistor 151 connected between the ground line 27 and the minus 300-volt line 28. A condenser 152 may be connected across the resistor in order to make sure that the capacity between the junction 149 and the grid 134 of the tube 21 will always exceed the stray capacity of the grid 134 and the reader brush 127. Accordingly no signal less than the desired amount can possibly fire the tube 21.

The amplifier circuit illustrated in Fig. 1 operates in the following manner. When the photoelectric tube 11 is exposed to a source of light, whether it be the white background, or the black background, any glare from the lamp housing, or to the article itself being sorted, the light impinging upon the tube 11 determines the magnitude of the flow of current through. Assuming that the circuit has been compensated by the use of the white and black backgrounds and that an object to be sorted comes into the field of view of the photoelectric tube 11, the reflectivity of the object to be sorted will determine the intensity of the illumination of the tube 11 and thereby determine its conductivity. Assuming the apparatus is set to operate at "light trip," if the reflectivity of the object to be sorted is equal to or greater than, the predetermined value for which the object is to be accepted, and above that for which the object would be refused, the amplifier will cause a signal to be produced at the control electrode 58 of the selector thyratron 18 greater than the trip value for thyratron 18. Thereupon current flows from the line 130 through one of the signal storing condensers 123 thereby charging the condenser. The condenser charge is subsequently utilized in a suitable device such as apparatus including the classifier thyratron 21 to produce a desired operation.

This comes about in the following manner. As the intensity of illumination of the tube 11 increases and its conductivity increases the current flow therein will increase, causing a voltage drop in resistor 87 thereby dropping the potential of the grid 95 of the amplifier tube 12. This in turn raises the plate potential of the tube 12, raising the potentials of the grid and the cathode of the cathode follower 17, and raising the potential of the grid 34 of the tube 13. The plate potential of the tube 13 is accordingly depressed, depressing the potential of the grid and the cathode of the cathode follower 15.

The negative impulse is transferred through the resistor 52 to the grid 53 of the tube 14, depressing its potential and raising the plate potential of the tube 14, thereby elevating the potentials of the grid and the cathode of the cathode follower 16. Assuming that the transfer switch 57 is in the upper or "light trip" position the rise in potential of the cathode of the cathode follower 16 is transferred through the voltage divider 56 to the tap 59, which thereby elevates the potential of the grid 58 of the tube 18 and causes it to fire.

If any changes should take place in characteristics of the circuits, such as filament voltage, tube aging, photocell sensitivity, or lamp darkening, then during the portion of the cycle after the observed object has disappeared from view, and when the white background is next exposed to the photoelectric tube 11, the potential of the cathode of the cathode follower 15 will have deviated from the value at which it was set. Accordingly, the voltages between the points 71 and 75, and between the points 73 and 77 of the transfer switch for the regulating condenser 63 will not be equal. However, during this portion of the cycle, the transfer switch is operated and the condenser 63 is charged or discharged sufficiently so as to readjust the voltage between the terminal 71 and 75 to the value required to raise or lower the potential of the grid 64 of the regulator tube 22 sufficiently to vary the multiplication factor of the photoelectric tube 11 in the required amount to produce the required adjustment in output and therefore in voltage at the cathode of the cathode follower 15.

On the other hand, during the portion of the cycle when the black background is exposed to the view of the photoelectric tube 11, if the glare in the lamp housing is increased or dust has settled upon the lamp or lamp housing, so as to change the extraneous light falling upon the photoelectric tube 11, the output of the circuit and therefore the potential of the tap 112 in the cathode resistor 44 of the cathode follower 15 will have deviated from the value previously existing at the terminal 103 of the glare compensator condenser 102. Since the glare compensator switch 111 is closed momentarily during this portion of the cycle, any required adjustment in the charge of condenser 102 is made by the connection and the operating point is corrected or reset to compensate for such a change in glare conditions. Accordingly, the next time an object is exposed to the view of photoelectric tube 11 both ends of the linear characteristics curve or line of the amplifier will have been corrected. The amplifier will give a signal accurately representing the reflectivity of the object exposed to the photoelectric tube 11.

Figure 2:
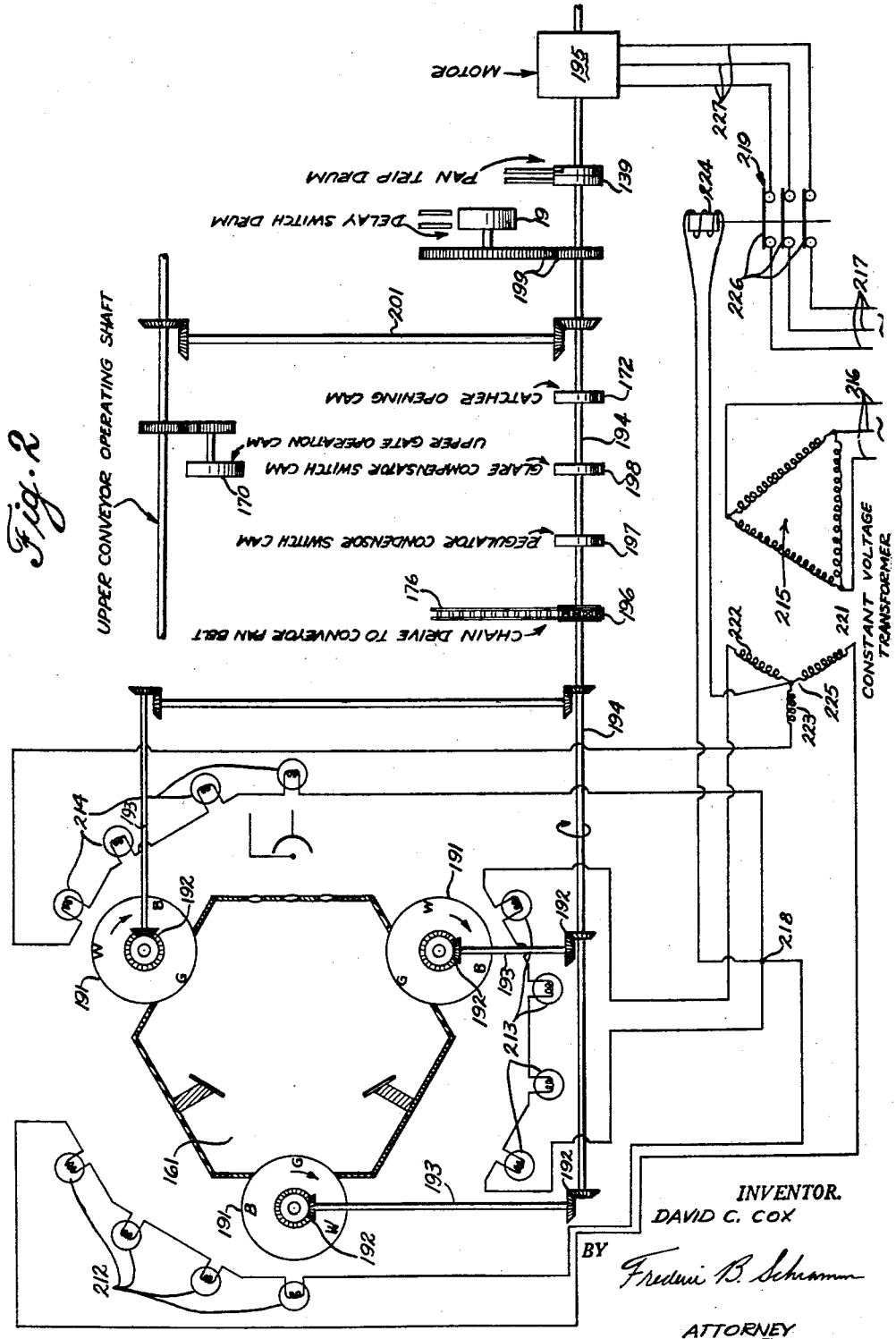
Fig. 2 is a schematic diagram illustrating mechanical elements of an assembly in which my improved amplifier circuit may be employed to form a photoelectric sorting system, and showing diagrammatically in plan view an optical system of such assembly.

The amplifier illustrated in Fig. 1 is useful for a variety of problems where linear output or accurate inverted reproduction of a signal is desired. However, for the sake of illustration the use of the circuit will be described in connection with a form of electric sorter of the free fall type although it will be understood that the use of the circuit is not limited to sorting apparatus, nor to any particular type of electric sorting apparatus. One form of free fall electric sorter in which the circuit may be employed, is illustrated in Figs. 2 and 3.

In such apparatus there is a lamp housing 161 through which fragile objects to be sorted, such as lemons may be allowed to fall. The lamp housing 161 is represented as being of the hexagonal type which is described more fully in my copending application, Serial No. 64,967, filed December 13, 1948 on which Patent 2,656,923 issued on October 27, 1953. The apparatus shown by way of illustration comprises a suitable supply conveyor such as a conveyor 162 for supplying objects such as lemons 163 to an upper gate 164 from which the objects, such as a lemon 165 may fall until it is received by a lower gate 166 forming a part of a catcher 167 so designed so as to travel downward with a very rapid acceleration as the article reaches the lower gate 166 so as to avoid bruising the article and to decelerate gradually so the effect is as if the object had fallen only a very short distance, a fraction of an inch, for example, instead of the vertical distance in the lamp housing 161.

Figure 3:
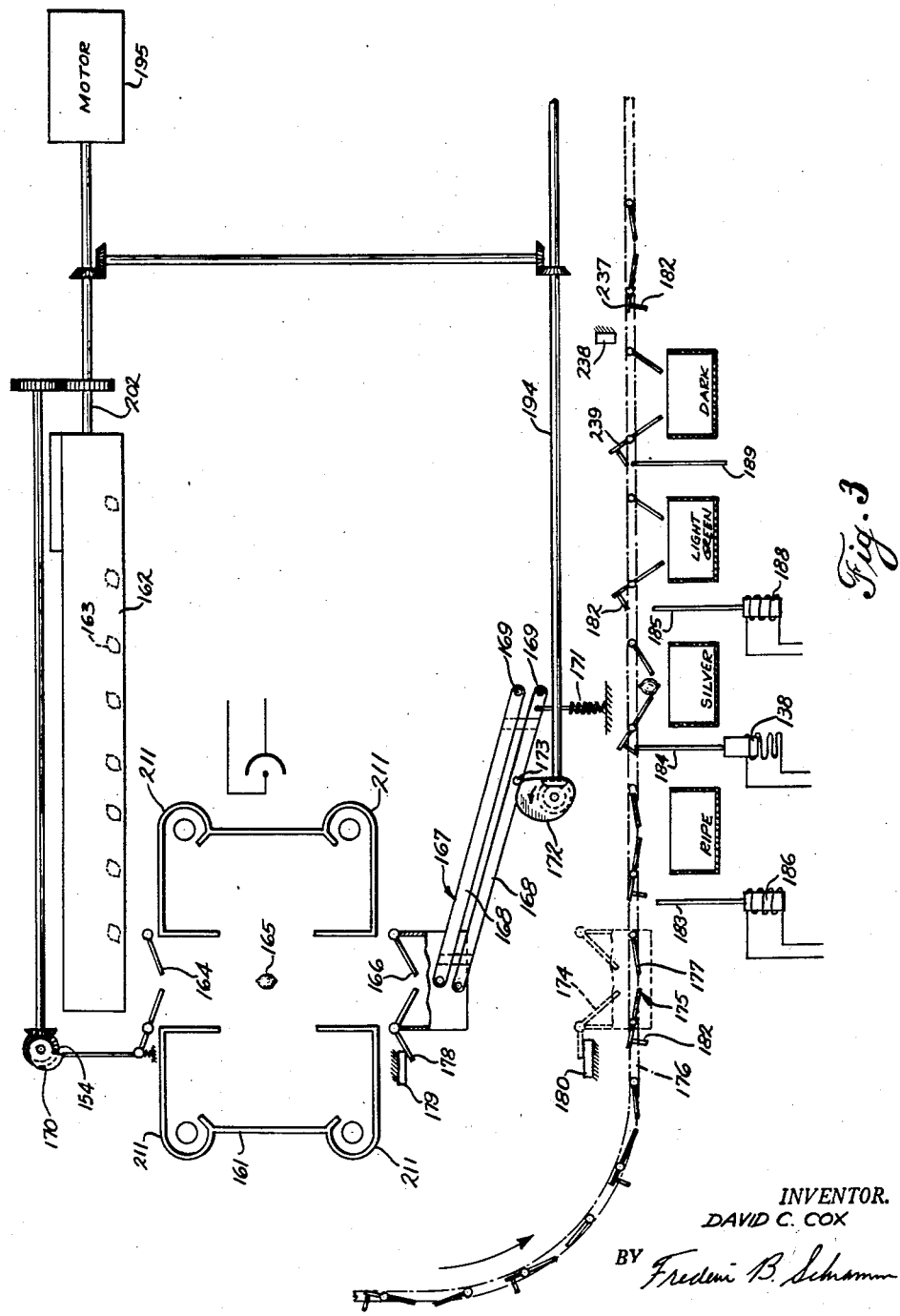
Fig. 3 is a fragmentary schematic diagram of the system illustrated in Fig. 2 representing an optical system diagrammatically in elevation and diagrammatically representing a conveyor system for supplying articles for sorting to the optical system and removing them from the optical system and classifying them.

The catcher as schematically illustrated in Fig. 3 includes operating arms 168 carrying the lower gate 166 and pivoted at points 169. The catcher 167 is urged downward by a spring 171 but controlled by a cam 172, cooperating with a cam follower 173. As represented by the dotted lines 174 the catcher 167 is arranged to bring the lower gate 166 to a lower position at which the object has been substantially decelerated and rests just above one of the conveyor pans 175 of a chain conveyor. The chain conveyor is represented schematically by broken lines 176. Each conveyor pan, as represented schematically, includes pivoted bottom plates or leaves 177 so as to form a moving single article discharge or release hopper with a lower gate similar in form to the lower gate 166 or the upper gate 164.

Suitable mechanism is provided for operating the gates. For example, a cam 170 with a steep fall portion 154 may be provided for operating the upper gate 164. The lower gate 166 may be provided with an arm 178 adapted to strike upper and lower stationary abutments or stops 179 and 180, so as to be closed in the upper position and open in the lowermost position of the catcher 167. Likewise, the dump pan leaves 177 in each of the conveyor pans 175 may be provided with a trip means or operating arm 182 adapted to be actuated by trip pins 183, 184 and 185, cooperating with solenoids 186, 138 or 188, or by a fixed trip pin 189.

As shown in Fig. 2 the lamp housing 161 is so arranged as to permit the backgrounds to be changed in the course of the cycle of the apparatus. To this end in the form of arrangement illustrated, the backgrounds are on the surfaces of cylinders 191. The periphery of each cylinder is divided into three parts. One is white; one is black; and the third is gray, preferably a shade of gray corresponding approximately to the reflectivity of the average of the classes of the acceptable articles which are to be sorted. The cylinders 191 are arranged to be rotated in any suitable manner. In practice I prefer to utilize an eccentric drive arrangement. However, for the sake of simplicity in the drawing, the drive is represented diagrammatically by bevel gears 192 with connecting shafts 193 so as to be driven by a main shaft 194 driven by a motor 195.

As illustrated schematically in Fig. 2 the motor 195 is arranged to drive simultaneously and in synchronism all of the various mechanism to which reference has been made. Thus for driving the chain 176 carrying the conveyor pans 175 illustrated in Fig. 3, there is a sprocket 196 on the shaft 194 which also carries a cam 197 for operating the transfer switch of the regulator condenser 63 of the Fig. 1 and a cam 198 for operating the glare compensator switch 111 of Fig. 1. The shaft 194 also carries the cam 172 for operating the catcher 167, reduction gears 199 for driving the delay switch 19 of Fig. 1 at a reduced speed, in this case ⅛ the speed of the shaft 194 and of the classifier commutator 139 of Fig. 1. The shaft 194 also drives through a bevel gear and shaft arrangement 201, the upper gate operating cam 170 and a shaft 202 for operating the conveyor 162 of Fig. 3.

Thus far only one selector thyratron 18 and one classifier thyratron 21 have been described. If desired, however, the apparatus may be arranged to respond to a plurality of different fixed settings so as to classify articles in a plurality of different groups. For example, if the apparatus is used for sorting lemons and it is desired to separate the lemons into four groups, namely, light green, silver, ripe and dark, additional units such as those including thyratron 18' and 21' and thyratrons 18'' and 21'' may be provided. These may be similar to the unit including the thyratron 18 and 21. One such unit including thyratrons 18'' and 21'' has an input tap 61 to respond to light green lemons. The unit including thyratron 18 and 21 has a tap 59 to respond to silver lemons. Another such unit including thyratron 18' and 21' has a tap 62 to respond to ripe lemons. The dark lemons being in the fourth group, which does not actuate the phototube amplifier, only the three taps 61, 59 and 62 are required for the four-part classifications. The trip-pin solenoids 186, 138 and 188 are shown in Figs. 1 and 3. The solenoids 186 and 188 shown in Fig. 3 are connected in the same manner as illustrated in Fig. 1 for the solenoid 138 but in other amplifier response units having the input taps 61 and 62.

For illuminating the interior of the lamp housing 161, banks of lamps are mounted in lamp troughs 211 and distributed therein in order to provide uniform illumination of the object 165. Preferably the lamps are divided into separate banks of series connected lamps energized by separate lines in order to aid further in equalizing illumination in the lamp housing 161. In order to overcome any effect of flicker on alternating-current circuits, the banks of lamps are connected to separate phases of a poly-phase alternating-current system. For example, as represented diagrammatically in Fig. 2, there are three banks 212, 213 and 214 of four lamps each connected to three phases of a three-phase A.-C. system. It will be understood that the lamps are actually mounted within the lamp housing as shown in Fig. 3, but to simplify the representation of the electrical circuit in Fig. 2 the lamps have there been illustrated out of place.

Preferably the lamps in each bank are connected in series, and the banks are star or Y-connected to a star or Y-connected three-phase source.

In this manner phase unbalance in response to burning out of any lamps may be made to give an indication in order to avoid non-uniform illumination caused by lamp burn-out. As shown in Fig. 2, a delta-Y or mesh-star connected constant-voltage transformer 215 is employed, which may be of a suitable type to maintain voltage closely such as those sold under the trade name, "Sola," e.g. The transformer 215 has primary windings connected to a three-phase line 216, which is illustrated as separate from a power line 217 for energizing the motor 195.

The lamp banks 212, 213 and 214 are each connected at one end to a neutral terminal 218 and at the other end to one of the transformer secondary windings 221, 222 and 223, respectively.

For shutting down the apparatus automatically in the event that one of the lamps burn out, a phase-balance relay or contactor 219 is provided to disconnect the motor 195. The contactor 219 has an operating coil 224 connected between the lamp-load neutral 218 and the neutral point 225 of the transformer secondary windings 221, 222, and 223. Actuated by the coil 224, are normally closed contacts 226, each in series with one of the conductors 227 between the motor 195 and the power line 217.

The gates 164, 166 and 177 may be similar in construction except for the arrangement of the tripping or operating arm. For example, as illustrated in Fig. 4, the lower gate 166, carried by the arm 168 of the catcher 167 consists of two leaves or dump plates 228 and 229, having supporting arms secured to pivots 231 and 232, respectively, so that each leaf swings about a pivot above the other. To cause the leaves 218 and 219 to pivot in unison for opening and closing the gate 166, meshing gear segments 233, and 234 are secured to the pivots 231 and 232 respectively.

A tension spring 235 is connected between a point 236 on one of the gate leaves 228, and a support 237 in the arm 168, at approximately the level of the pivots 231 and 232 for holding the gate 166 open or closed. This is made possible by permitting the gate leaves to swing sufficiently far for spring 235 to pass from one side to the other of the center point 231. The trip arm 178 is also secured to one of the gate leaves 228 for causing the gate 164 to open or close according to whether the catcher arm 168 causes the trip arm to strike the stop 180 or the stop 179.

The background cylinders 191 have their peripheries divided into three separate areas, painted separate shades to serve as separate backgrounds or may have separate interchangeable background plates of the specified shades mounted thereon. A developed view is shown in Fig. 8. The invention is not limited thereto but satisfactory results are obtained by making each background area 120° in extent.

The manner of operation of the circuit of Fig. 1 in an illustrative sorting machine such as the lemon sorter, represented in Figs. 2 and 3, is shown by the sequence table of Fig. 5. In the table, however, only one sixth of the periphery of the collector ring 116 can be represented and only one of the drum segments 117 of the delay device commutator 19 can be shown, since the commutator 19 makes only one revolution in six operation cycles of the apparatus and Fig. 5 represents a single cycle of operation. For the sake of illustration, it is assumed that the backgrounds on the cylinder 191 are exposed in the order black, white, gray. Although this is the preferred order the invention is not limited thereto.

At the instant when the main drive shaft 194 is at a point designated as 0° of rotation, the upper gate 164 opens and releases a lemon by reason of the angular relationship between the shaft 194 and the cam 170. The shafts carrying the background cylinders 191 may be so set that the white background is exposed to the phototube 111 from the previous 330° position of the shaft 194 to the 90° position. During that period the phototube is regulated by operation of the regulator condenser shifting switch, e.g. at about 30°.

If the white background is exposed during the period indicated, the black is exposed to the phototube 11 from the previous 210° position of the shaft 194 to the 330° position. During this period the glare-compensator switch 111 is temporarily closed, e.g. it may close at 240° and open at 300°. This compensates the amplifier for whatever the glare conditions may be at the time. It will be understood that during the earlier part of the revolution, the phototube had already been regulated in accordance with circuit response to the white background standard.

After the shaft 194 has turned 90° and until it has reached the 210° position, the photocell is exposed to the gray background. During this period of time the lemon 165 is falling through the lamp housing 161 and one of the delay commutator segments 117 remains in contact with the selector thyratron brush 125 in order that a signal will be impressed on the associated signal storing condenser 123 in the event that this lemon 165 should have such reflectivity as to cause the amplifier to respond and fire the thyratron 18. Specifically for the case illustrated the circuit acts if the lemon is as bright as a "silver" lemon, i.e. no longer green but not quite yellow.

The relationship between lemon positions in the lamp housing and angular position of the shaft 194 is determined by the angular speed of the shaft and the physical law stating the speed and acceleration of freely falling bodies. The shaft speed may be made such in relation to dimensions of the lamp housing and position of the upper gate that the lemon tip enters the lamp housing at 104°; the lemon tip enters the field of view of the photoelectric tube at 132°; the lemon is centered in view at 151°, the tip leaves the view at 168°; and the lamp housing is empty at 188°.

What thereafter happens to the lemon has no effect upon the amplifier because the lemon is no longer in the lamp housing. However, it is in this period between 210° and 330°, while the black background is in effective position, that the amplifier is compensated for glare as previously explained.

For example, the angular setting of the catcher operating cam 172 may be such that at 237°, the lemon 165 reaches the catcher and the catcher starts moving down with an acceleration four times that of gravity to make the contact of the lemon with the lower gate 166 very gentle. The catcher gradually decelerates owing to the shape of the cam 172 until the catcher and lemon come substantially to rest at 300° with the catcher at the bottom of its stroke. Thereupon the catcher gate arm 178, having struck the stop 180, opens the lower gate 166. At the same instant the conveyor pan 175 has come under the lower gate to receive the lemon 165.

During the next and succeeding cycles the action is repeated with regard to succeeding lemons.

The results produced by the lemon 165 which fell during the first described cycle may, however, be examined. During the next cycle owing to the fact that the drum switch 19 rotates at one-sixth the speed of the cycles, the segment 117 comes into the position of segment 118 of Fig. 1. There is, however, no brush in this position and no action takes place.

During the third cycle, between 90 and 200 degrees, the segment 117 comes into the position of segment 119. The charge on the associated condenser 123 has no effect on the grid 134 of the classifier thyratron 21, because the charging of the condenser reduced the potential of the plate connected to the brush 127 to substantially ground potential and insufficient to fire the thyratron 21.

Accordingly, the trip pin 184 in Fig. 3 remains up. As soon as the conveyor pan 175 reaches the position of the "silver" bin the gate arm 178 strikes the trip pin 184, opens the pan and deposits the lemon in the silver lemon receptacle.

On the other hand if that one of the condensers 123 connected to the brush 127 had been uncharged, the potential of the grid 134 would have been raised rendering the thyratron 21 conductive. As shown in Fig. 5, at this time, commutator brushes 145 and 146 are short circuited by the conducting portions 141 and 142 of the commutator 139 and a direct circuit is provided to the plate of the thyratron 21 from the 150 volt line 130 through the solenoid 138. Accordingly, the trip pin 184 in Fig. 3 would be retracted so as not to open the pan. This is what happened in the "ripe" circuit of thyratrons 18' and 21'. Since the photoelectric output was not great enough to free the thyratron 18', the thyratron 21' fired. This retracted the solenoid 186 and caused the pan to go by the "ripe" position without dumping.

As shown in Fig. 5 after angular position 180° the brush 146 becomes disconnected from the segment 142 and from the brush 145. The classifier tube 21 is extinguished by reason of the build up of charge across the condenser 148. Then at about angular position 210 degrees, the brushes 145 and 147 are connected together, causing the condenser 148 to discharge through the resistor 140. Since voltage is thus reapplied gradually to the anode of the thyratron 21, it remains de-ionized preparatory to the next operation.

As already pointed out, for use in multiple-group classifying sorters additional amplifier responsive units are provided corresponding to that including thyratrons 18 and 21. In the case of a four-way lemon sorter the unit for ripe lemons has an input tap at the position 62 of Fig. 1 and a classifier thyratron energizing brush at position 132 for operating solenoid 186 of Fig. 3, the unit for light green having these corresponding parts at positions 61, 133 and 188 respectively.

Referring to Fig. 3, any lemons in pans not already tripped are caused to fall in the "dark" receptacle by the fixed trip pin 189. Then when the pans of the conveyor reach the position of the fixed stop 238, they are restored to the closed position as the ends 239 of the pans 175 strike the stop 238.

The foregoing explanation assumes "light-trip" operation. For "dark-trip" operation with the transfer switch 57 of Fig. 1 in the lower position, the order of operation would be reversed and the order of the receptacles in Fig. 3 would be reversed to Dark, Light Green, Silver, and Ripe, the "ripe" lemons then being the ones too bright to have been dropped from the conveyor pan by any of the preceding thyratron-operating solenoids having failed to retract.

In the specific circuit described a variation of 150 volts at the cathode of the cathode follower 15 is obtained in changing from the black to the white background. Likewise the same magnitude of change with reversed polarity is obtained at the cathode of the cathode-follower tube 16. No compensation against the gray background is required because the asplifier output is linear, as shown in Fig. 6. Calibration of the black and white points 241 and 243, respectively, fixes the voltage of the point 242 at which trip is to occur.

While I have described my invention as embodied in concrete from and as operating in a specific manner in accordance with the provisions of the patent statutes, it should be understood that I do not limit my invention thereto, since various modifications thereof will suggest themselves to those skilled in the art without departing from the spirit of my invention.

What is claimed is:

1. Apparatus for handling various articles comprising in combination an upper gate, a catcher having upper and downward positions, the upper position being spaced below said upper gate, an article responsive device interposed between said upper position of the catcher and the upper gate, whereby a selection depending upon the characteristic of the article is made during free fall of the article from the upper gate to the upper position of the catcher, and synchronizing means for opening the upper gate and variably accelerating the catcher from its upper position towards its downward position before the instant when the object has reached said upper position, said acceleration being initially greater than the acceleration of gravity, and decreasing thereafter, whereby the article drops upon the catcher with an impact equivalent to a shorter fall than the actual distance between the upper gate and the upper position of the catcher, and the article comes substantially to rest at the downward position of the catcher.

2. Apparatus as in claim 1 wherein the catcher includes a releasable holding mechanism, and the apparatus includes an actuator for releasing said catcher holding mechanism at the downward position of the catcher, and means below said catcher downward position for receiving the article from the catcher, whereby the operation cycle of the upper gate and the catcher may be repeated.

3. In a sorting machine of the optical type having a lamp housing and article conveyor mechanism, an electric motor for driving the conveyor mechanism, a plurality of lamps divided into a plurality of banks mounted within said lamp housing for illuminating articles passing therein, a disconnect switch for said motor, terminals for a poly-phase current source connected to said lamp banks for energizing said lamps, said polyphase source and said banks being star connected, each having a neutral terminal, a solenoid for actuating the disconnecting switch between the said neutral terminals, whereby burnout of one of said lamps or interruption in the current of one of said lamps banks unbalances the polyphase system, causing current to flow between said neutral terminals through the switch solenoid for opening the circuit of the motor and shutting down the sorting machine, in order to guard against faulty responses in the event of disturbance in the light balance in said lamp housing.

4. In a sorting machine adapted to inspect an article while the article is falling freely, the combination of a release mechanism adapted to hold an article and to drop the article upon actuation thereof, catcher means with a mechanism for moving it vertically in the path of fall of the object at approximately the speed thereof, said catcher being adapted to receive the object while moving at such speed approximating that of the object, the catcher moving mechanism including means to decelerate the catcher to a substantially rest position, and drive means for actuating the said gate and the said catcher moving mechanism in synchronism.

5. In release mechanism comprising at least one gate member for holding an article and a rotating cam for actuating the gate member to drop the article, an inspection head below the release mechanism, catcher means below the inspection head adapted to move in the path of fall of the article and to receive the article while moving at a speed approximating that of the article and then bring the article to a substantially rest position and comprising an article holder, arm means, fixed support means upon which the arm means is pivoted at one end thereof and the holder being carried at the remaining end of the arm means, drive means for reciprocating the arm means comprising a rotating cam operatively engaging the arm means intermediate the ends thereof, and drive means for the said release mechanism and the said catcher means including a motor and transmission means interconnecting the motor and the said cams, so connected that the catcher means makes one stroke for each operation of the release mechanism and is in downward travel at constant velocity after the release mechanism has operated to drop an article thereon.

6. In combination a release mechanism comprising at least one gate member for holding an article and a rotating cam for actuating the gate member to drop the article, an inspection head below the release mechanism, the said cam having a substantially uniform contour around the greater part of the circumference thereof and an actuating contour along a relatively small part of the circumference thereof for intermittently operating the gate member, catcher means below the inspection head adapted to move in a path of fall of the article and to receive the article comprising an article holder, arm means, fixed support means upon which the arm means is pivoted at one end thereof and the holder being carried at the remaining end of the arm means, drive means for reciprocating the arm means comprising a rotating cam operatively engaging the arm intermediate the ends thereof and the cam having a contour adapted to move the holder at a speed approximating that of the falling article and then rapidly bringing the holder to a substantially rest position, and drive means for the said release mechanism and the said catcher means including a motor and transmission means positively interconnecting the motor and the said cams, said cams being so mounted with respect to the transmission means that the catcher means makes one stroke for each operation of the release mechanism and is in downward travel at constant velocity after the release to drop an article thereon.

7. In combination a release mechanism adapted to hold an article, an actuator for the release mechanism causing it to drop the article upon actuation thereof, catcher means, mechanism for moving it in the path of fall of the article, said catcher being adapted to receive the article while moving at a speed approximating that of the article and then bring the article to a substantially rest position, means for synchronizing the actuation of said actuator and catcher means mechanism, the said catcher means including an article holder comprising at least one releasable pan member adapted to open the holder when released, and mechanism synchronized with movement of the catcher to rest position for releasing the said pan member to release the article as the catcher reaches the rest position.

8. In combination a release mechanism adapted to hold an article, an actuator for the release mechanism causing it to drop the article upon actuation thereof, catcher means below the release mechanism having mechanism for moving it in the path of fall of the article, said catcher being adapted to receive the article while moving at a speed approximating that of the article and then bring the article to a substantially rest position, means for synchronizing the actuation of said actuator and catcher means mechanism, the said catcher means including an article holder comprising at least one pan member adapted to be rotated to open and close the holder, and means for rotating the said pan member to open position to release the article as the catcher reaches the rest position comprising a rotary lever operatively connected to the pan member and a trip block adapted to be engaged by the lever.

9. In combination a release mechanism adapted to hold an article and to drop the article upon actuation thereof, catcher means, mechanism for moving it in the path of fall of the article, said catcher moving mechanism being synchronized with said release mechanism and including means to decelerate the catcher to a substantially rest position, and the catcher including openable article holding means synchronized with the catcher moving mechanism to release the articles at substantially rest position.

10. In combination a release mechanism comprising a gate member and a rotating release-mechanism cam for actuating the gate member to drop an article, catcher means with mechanism for moving it up or down in the path of fall of the article, said catcher means being adapted to receive the article while moving at a speed approximating that of the article and comprising an openable article holder, arm means, fixed support means upon which the arm means is pivoted at one end thereof and the holder being carried at the remaining end of the arm means, and conveyor means positioned so as to move along a path adjacent the lowermost position of the catcher means and comprising a conveyor chain and a plurality of carriers spaced along the conveyor chain, drive means for the said release mechanism and the said catcher means comprising a motor and synchronized transmission means positively connecting the said motor to the said catcher moving mechanism and the said release mechanism cam, drive means for said conveyor synchronized with said catcher drive means to bring a carrier into position under the catcher means for each cycle of the movement of the catcher means, and means for opening the said article holder to drop the article into a carrier as the catcher reaches the lowermost position.

11. In combination a release mechanism for intermittently dropping articles and comprising a gate member and a continuously rotating release-mechanism cam for actuating the gate member, catcher means, cam mechanism for moving the catcher means vertically in the path of fall of the article, said catcher means being adapted to receive each article while moving downward at a speed approximating that of the article and comprising an openable article holder, an arm, fixed support means upon which the arm is pivoted at one end thereof and the holder being carried at the remaining end of the arm, and conveyor means positioned so as to move along a path adjacent the lowermost position of the catcher means and comprising a continuously moving conveyor chain and a plurality of carriers spaced along the conveyor chain, drive means for the said release mechanism and the said catcher means comprising a motor and synchronized transmission means positively connecting the said motor to the said catcher cam mechanism and the said release mechanism cam, and drive means synchronized with the catcher cam mechanism for operating the said conveyor to bring a carrier adjacent the lowermost position of the holder each time the catcher reaches the lowermost position, and means for opening the said article holder to drop an article into a carrier as the catcher reaches the lowermost position.

12. In combination an inspection head which has an opening for the passage of falling articles, a frame adapted to support the inspection head, a conveyor for carrying articles from the inspection head to an assorting apparatus after inspection comprising a conveyor chain carrying a plurality of spaced carriers and a sprocket wheel for the said conveyor chain, the said sprocket wheel being mounted upon the frame below the inspection head and positioned so that the carriers move along a path directly below the opening of the inspection head, and means below the inspection head opening, above the carrier path for catching articles which have passed through the inspection head including an openable holder to deposit an article in a carrier, and driving means for the said holder supported by the said frame and synchronized with said sprocket wheel to move said holder vertically at a speed substantially equal to that of the article while the holder is moving downward from the inspection head and to bring the holder to a rest position immediately above the carrier path when a carrier comes below said catching means.

13. In combination an inspection head which has an opening for the passage of falling articles, a frame adapted to support the inspection head, a conveyor for carrying articles from the inspection head to an assorting apparatus after inspection comprising a conveyor chain carrying a plurality of spaced carriers and a sprocket wheel for the said conveyor chain, the said sprocket wheel being mounted upon the frame below the inspection head and positioned so that the carriers move along a path directly below the opening of the inspection head, openable means interposed between said inspection head and the said conveyor for receiving the articles after they have fallen through the opening in the inspection head and reducing their speed to substantially zero without damaging the articles, means for opening said interposed means to deposit reduced speed articles in the carriers and drive means for the said conveyor synchronized with the interposed speed-reducing means and the opening means.

14. In combination an inspection head which has an opening for the passage of falling articles, a frame adapted to support the inspection head, a conveyor for carrying articles from the inspection head to an assorting apparatus after inspection comprising a conveyor chain carrying a plurality of spaced carriers and a sprocket wheel for the said conveyor chain, the said sprocket wheel being mounted upon the frame below the inspection head and positioned so that the carriers move along a path below the opening of the inspection head, and releasable means for catching and releasing the articles which have fallen through the inspection head with a cycle of motion and release equal in duration to the time for successive carriers to come into position for depositing each article in a conveyor carrier, the catching and releasing means being synchronized with the said sprocket wheel.

15. A sorting apparatus for sorting articles into classifications of different reflectivity comprising: a sensing assembly including an illuminated housing having a vertically disposed passageway through which an article is permitted to fall by gravity; illumination means for illuminating said article in said housing; photoelectric sensing means arranged to view articles falling freely through said lamp housing and illuminated by said illumination means; said photoelectric sensing means producing different signals in response to viewing articles having different reflectivities; means above said housing and aligned with said passageway for dropping articles one at a time into said passageway; a pan conveyor means including a plurality of conveyor pans each comprising a single article discharge hopper having means for receiving and releasably holding an article and trip means capable of being actuated for the holding means causing an article to be discharged therefrom; said pan conveyor means including means for moving said pans from a receiving station directly below said passageway to a plurality of distribution stations, at which receiving station the articles which are dropped through said passageway are received one into each pan; an electrical means interconnecting said photoelectric sensing means and said trip means for effecting the release of an article deposited in any one of said pans at one of said distribution stations subsequent to viewing of said article by said photoelectric viewing means and receiving of the article by the conveyor pans; said one distribution station being determined by the signal produced by said photoelectric sensing means in response to its viewing said article; means synchronizing the rate of dropping of the articles, the speed of the movement of the pans, and the actuation of the trip means so that an article is deposited in a pan and at a subsequent time the article is discharged from the pan at one of the distribution stations.

16. A sorting apparatus for sorting articles into classifications of different reflectivity comprising: a sensing assembly including an illuminated housing having a vertically disposed passageway through which an article is permitted to fall by gravity; illumination means for illuminating said article in said housing; photoelectric sensing means arranged to view articles falling freely through said lamp housing and illuminated by said illumination means; said photoelectric sensing means producing different signals in response to viewing articles having different reflectivities; means above said housing and aligned with said passageway for dropping articles one at a time into said passageway; a pan conveyor means including a plurality of conveyor pans each comprising a single article discharge hopper having means for receiving and holding an article and trip means capable of being actuated for releasing the holding means causing an article to be discharged therefrom; said pan conveyor means including means for moving said pans from a receiving station directly below said passageway to a plurality of distribution stations, at which receiving station the articles which are dropped through said passageway are received one into each pan; an electrical means interconnecting said photoelectric sensing means and said trip means and including time delay means for producing a plurality of time delayed signals; each of the plurality of delayed signals corresponding to one of the different signals produced by said photoelectric sensing means; said electrical means also including separate electrically operated actuating means at each distribution station for actuating said trip means at said distribution stations; each of said actuating means being responsive to a predetermined one of said time delayed signals produced by said photoelectric sensing means and delayed in time by said time delay means; means synchronizing the rate of dropping of the articles, the means for moving said pans, the extent of the time delay of the time delayed signals, and accordingly the actuation of said trip means whereby an article is deposited in a pan and at a subsequent time the article is discharged from the pan at one of the distribution stations.

References Cited in the file of this patent

UNITED STATES PATENTS

| | | |
|---|---|---|
| 468,500 | Gorges | Feb. 9, 1892 |
| 1,626,359 | Rundell | Apr. 26, 1927 |
| 1,903,001 | Jonas | Mar. 28, 1933 |
| 2,020,972 | Starr | Nov. 12, 1935 |
| 2,186,196 | Haugh | Jan. 9, 1940 |
| 2,190,935 | Cox | Feb. 20, 1940 |
| 2,244,826 | Cox | June 10, 1941 |
| 2,264,621 | Cox | Dec. 2, 1941 |
| 2,312,357 | Odquist | Mar. 2, 1943 |
| 2,319,833 | Troy | May 25, 1943 |
| 2,344,596 | Carmina | Mar. 21, 1944 |
| 2,429,991 | Coons | Nov. 4, 1947 |
| 2,471,479 | Coons | May 31, 1949 |
| 2,656,923 | Cox | Oct. 27, 1953 |
| 2,675,917 | Powers | Apr. 20, 1954 |
| 2,696,297 | Matthew | Dec. 7, 1954 |

FOREIGN PATENTS

| | | |
|---|---|---|
| 303,334 | Switzerland | Nov. 30, 1954 |